(12) United States Patent
Cooke et al.

(10) Patent No.: US 6,993,237 B2
(45) Date of Patent: Jan. 31, 2006

(54) PULLING GRIP FOR INSTALLING PRE-CONNECTORIZED FIBER OPTIC CABLE

(75) Inventors: Terry L. Cooke, Hickory, NC (US); John B. Johnson, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/724,510

(22) Filed: Nov. 26, 2003

(65) Prior Publication Data

US 2005/0111811 A1 May 26, 2005

(51) Int. Cl.
*G02B 6/00* (2006.01)
(52) U.S. Cl. ................... 385/135; 385/134; 385/136
(58) Field of Classification Search ............ 385/60–66, 385/78–85, 92–94, 134–136; 294/1.1, 86.42; 254/134.3, 264; 394/1.1, 86.42, 90.91
See application file for complete search history.

(56) References Cited

U.S. PATENT DOCUMENTS

| | | | | |
|---|---|---|---|---|
| 5,480,203 A | * | 1/1996 | Favalora et al. | 294/86.42 |
| 5,863,083 A | * | 1/1999 | Giebel et al. | 294/1.1 |
| 6,266,469 B1 | * | 7/2001 | Roth | 385/136 |
| 6,396,993 B1 | * | 5/2002 | Giebel et al. | 385/136 |
| 2002/0033554 A1 | * | 3/2002 | Heagy et al. | 264/269 |
| 2003/0063868 A1 | * | 4/2003 | Fentress | 385/78 |

OTHER PUBLICATIONS

Fiber Transport Services (FTS) SC-DC™ Trunk Cable Pulling Sleeve—Access and Reuse Product Sheets (SRP-009-027), Jan. 2001, pp. 1-4.
Fiber Transport Services (FTS) Trunk Cable Pulling Sleeve—Access/Reuse Update Product Sheets (SRP-009-026), Feb. 2001, pp. 1-2.
MIC® and Unitized MIC Cables Product Sheets, May 2002, 7 pages.

* cited by examiner

*Primary Examiner*—Frank G. Font
*Assistant Examiner*—Ryan Lepisto
(74) *Attorney, Agent, or Firm*—Christopher C. Dremann

(57) ABSTRACT

A pulling grip includes a pulling grip sleeve, a pulling grip housing and a furcation plug attached to the terminated end of a fiber optic cable. The pulling sleeve includes a bag adapted to be positioned over the pulling grip housing and the furcation plug and to be opened and closed by a lengthwise extending zipper. The pulling grip housing has a first compartment defining an elongate channel for routing optical fibers of the fiber optic cable and a second compartment defining a plurality of pockets that each store a plurality of fiber optic connectors mounted upon the ends of the optical fibers. The pulling grip housing may be formed as a plurality of injection molded modules to increase rigidity and to reduce manufacturing cost. The furcation plug includes means for readily integrating the furcation plug with a conventional distribution frame or rack, or with a cross-connect housing.

21 Claims, 11 Drawing Sheets

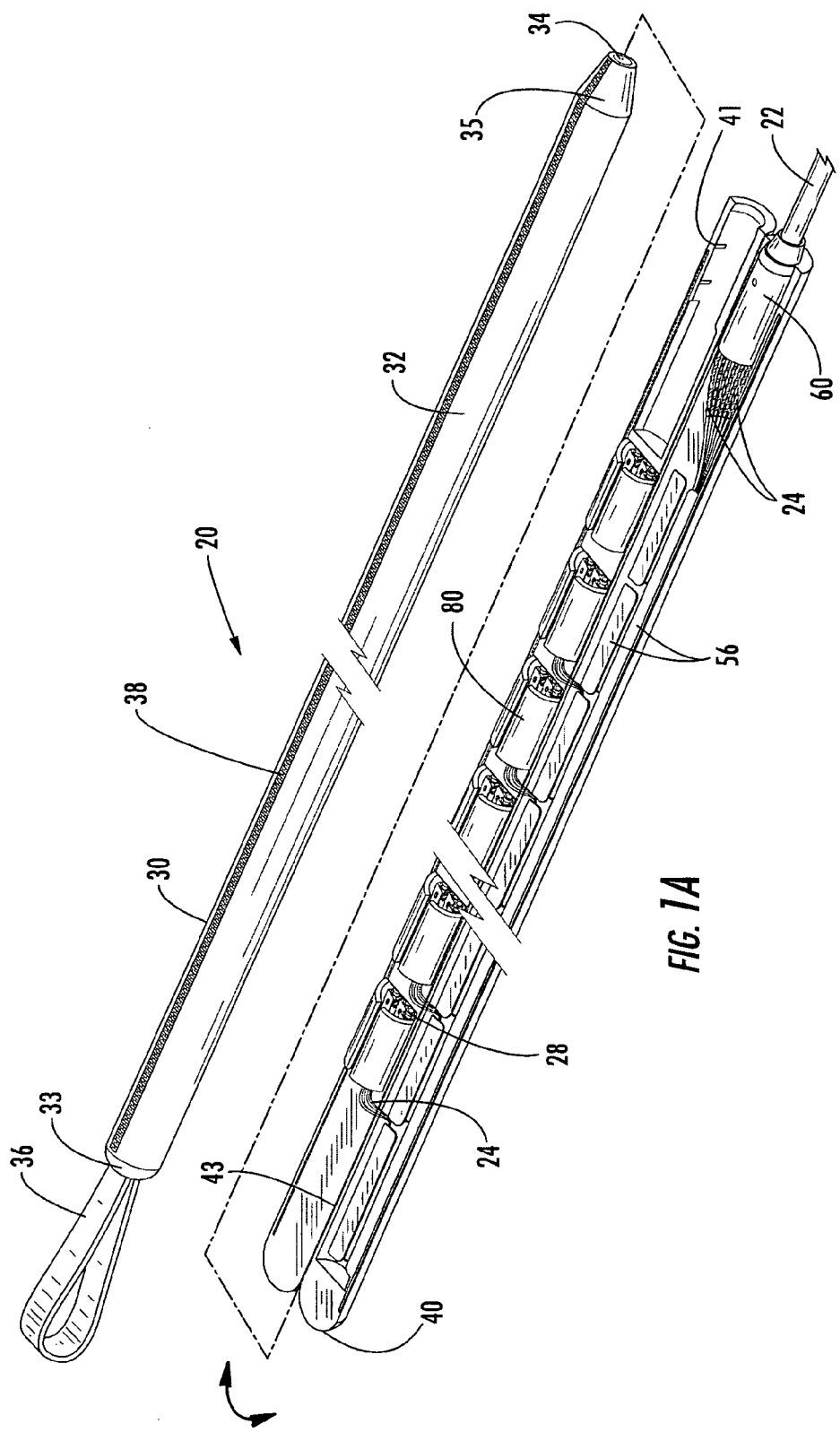

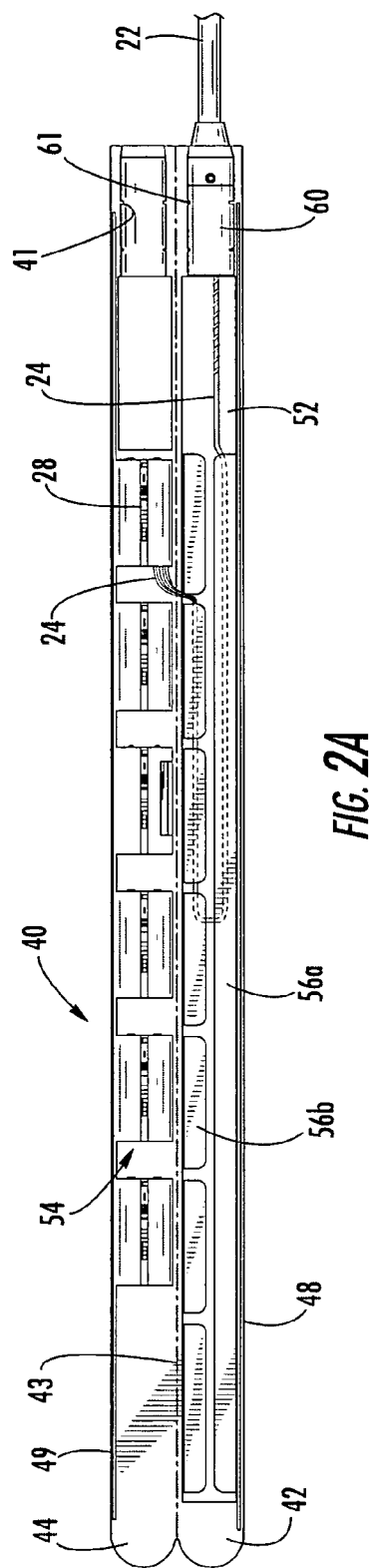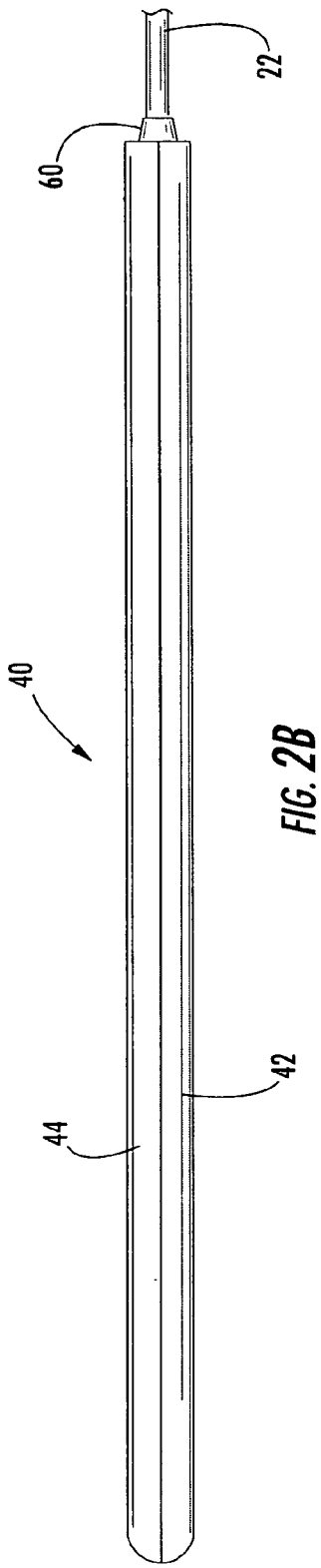

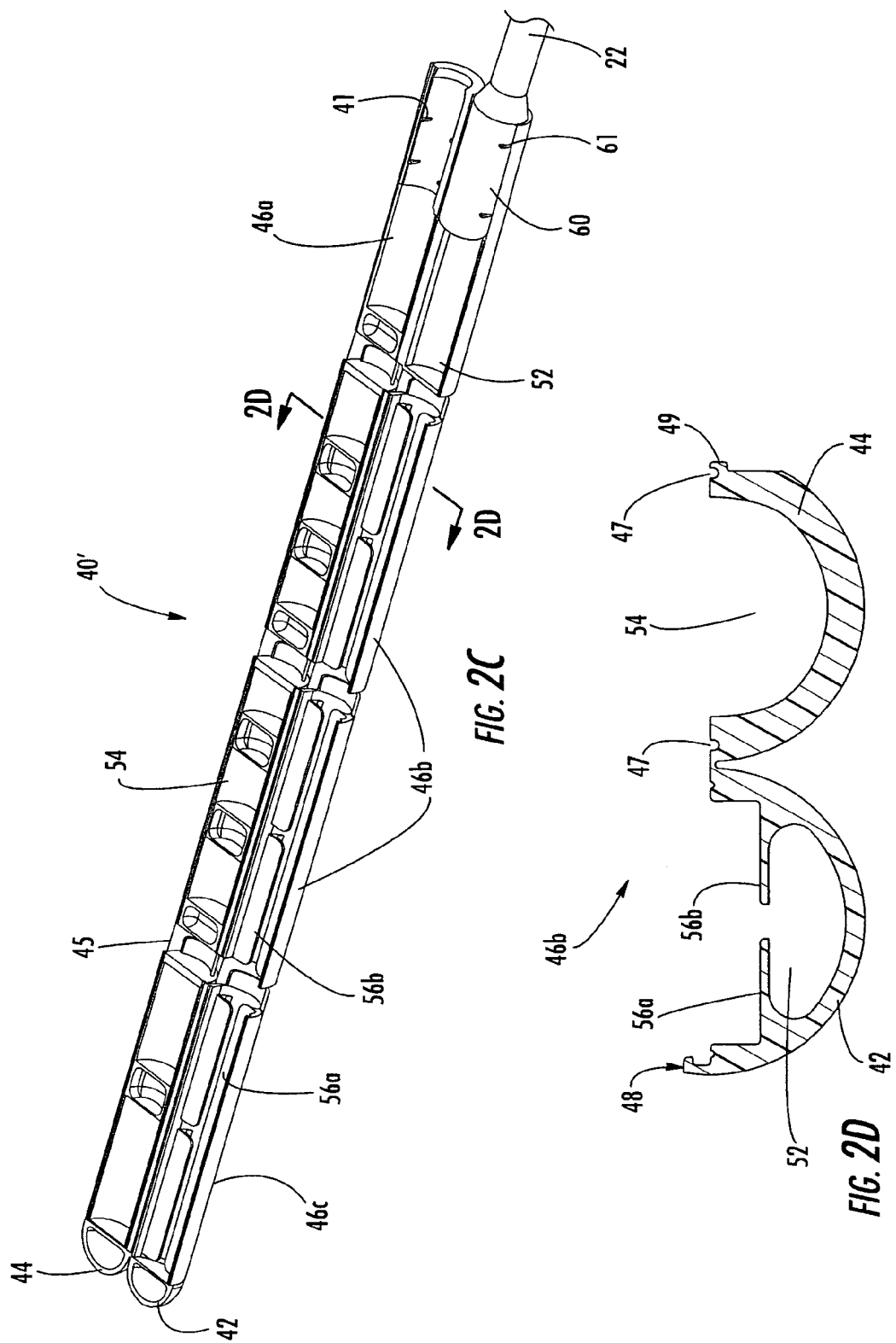

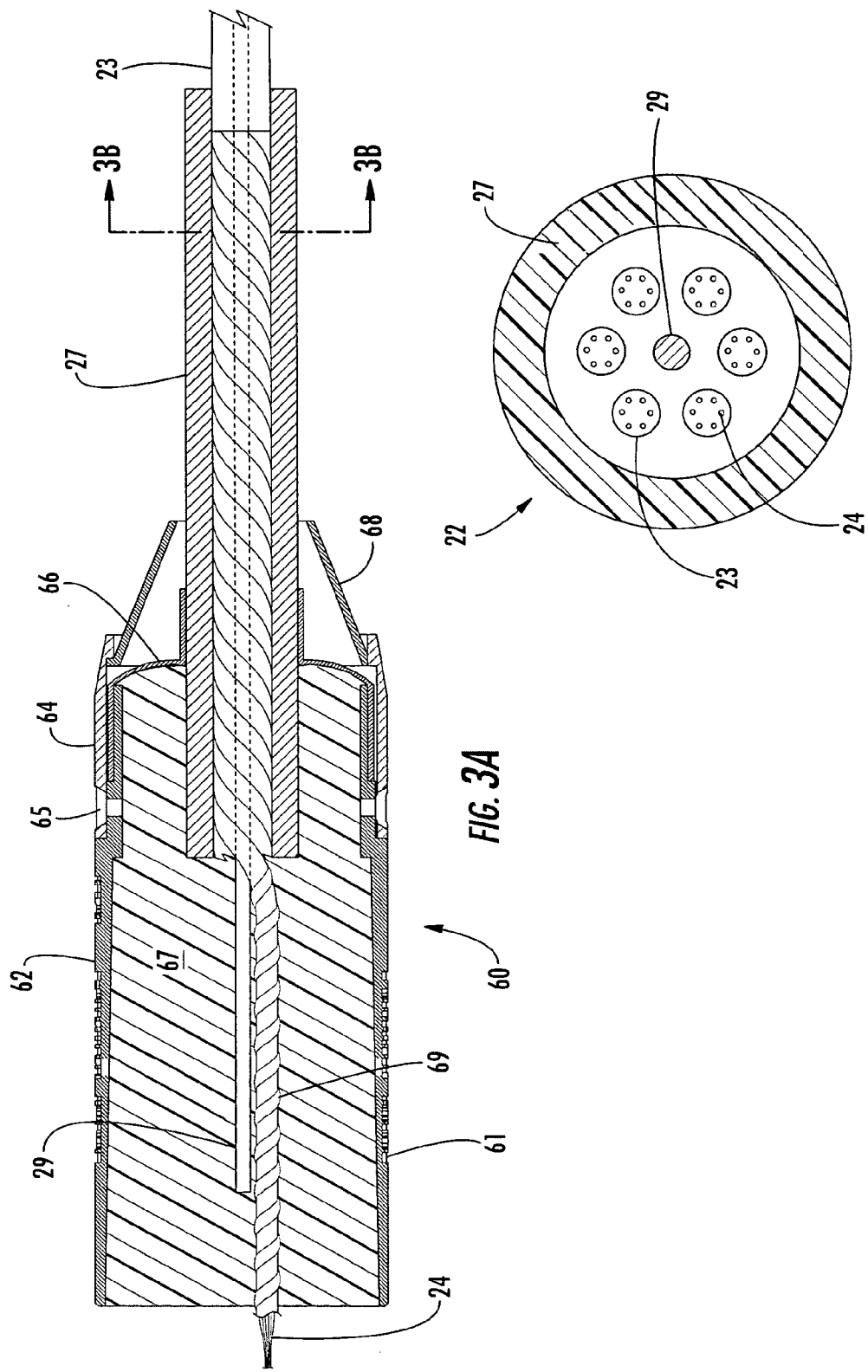

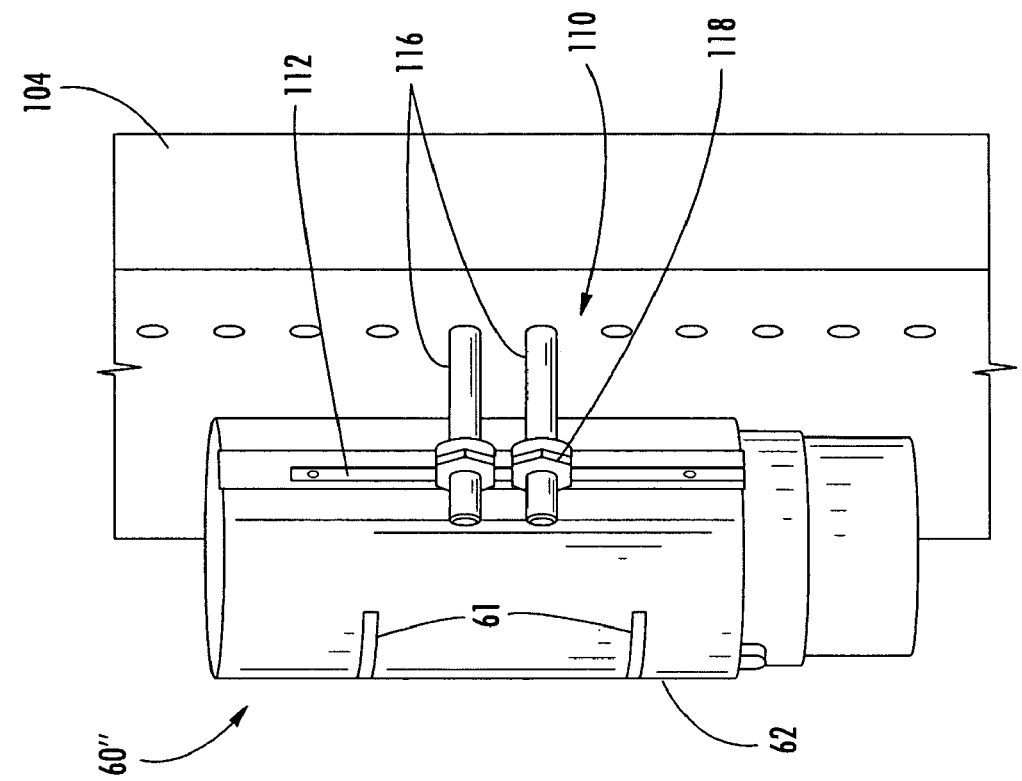
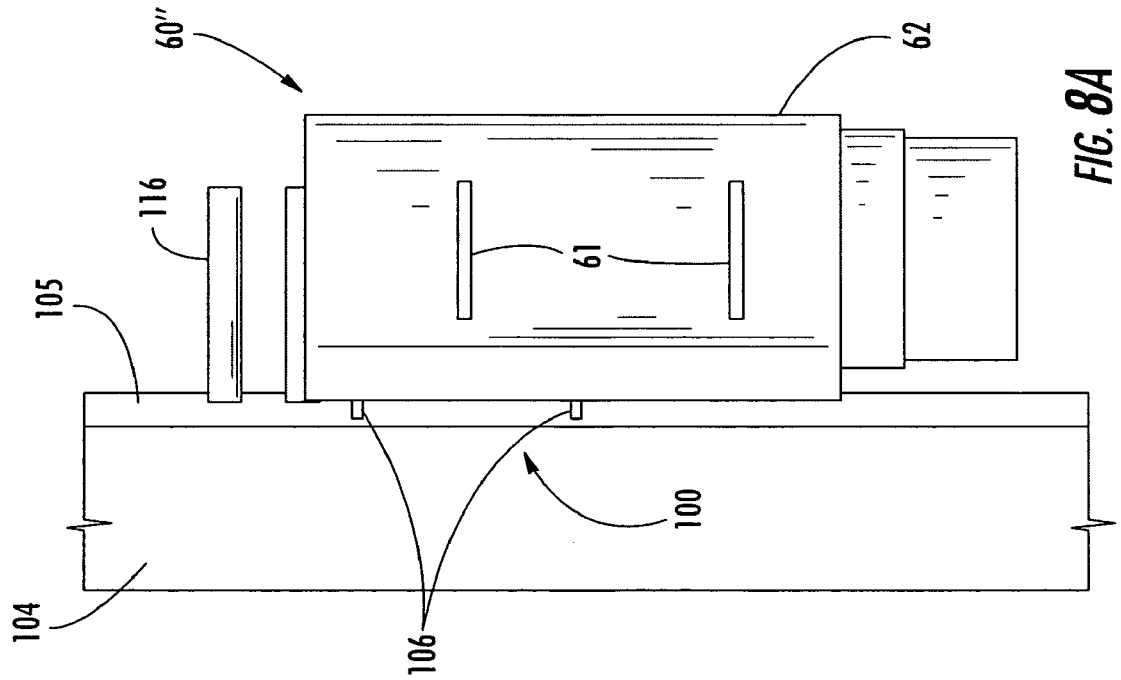
FIG. 8B
FIG. 8A

PULLING GRIP FOR INSTALLING PRE-CONNECTORIZED FIBER OPTIC CABLE

FIELD OF THE INVENTION

The present invention relates generally to a device for installing a fiber optic cable, and more particularly, to a pulling grip for installing a pre-connectorized fiber optic cable through a small diameter conduit or under a raised floor.

BACKGROUND OF THE INVENTION

In many instances, a pre-connectorized fiber optic cable, such as a trunk cable serving a data center in an office building, must be installed through a small diameter conduit or under a raised floor to satisfy space and aesthetic requirements. As used herein, the term "pre-connectorized fiber optic cable" refers to a communications cable including at least one optical fiber that is terminated to a fiber optic connector prior to installing the fiber optic cable at a service location, commonly referred to as a "customer premises." Typically, the fiber optic cable is manufactured to a predetermined length and one or more optical fibers are terminated to respective fiber optic connectors in the factory (commonly referred to as "factory-connectorized"). However, the optical fibers may also be terminated to the respective fiber optic connectors at the customer premises (commonly referred to as "field-connectorized") prior to installation of the fiber optic cable. In either case, the terminated end of the fiber optic cable and the fiber optic connectors must be protected during the installation. The current practice is to position the terminated end of the fiber optic cable and the fiber optic connectors within a protective housing, and to then pull the housing, connectors and cable through the conduit or under the raised floor using a conventional pulling sleeve having a pulling loop opposite the terminated end of the fiber optic cable. An existing pulling sleeve made of a mesh material and the use of the pulling sleeve to install a fiber optic cable is shown and described in recommended procedure documents SRP-009-026 Issue 2 entitled "Trunk Cable Pulling Sleeve" and SRP-009-027 Issue 3 entitled "SC-DC™ Trunk Cable Pulling Sleeve" published by Corning Cable Systems LLC of Hickory, N.C. Together, the protective housing and the pulling sleeve used to install a pre-connectorized fiber optic cable are known in the art, and referred to herein, as a "pulling grip."

In an existing pulling grip, the protective housing consists of a flexible length of corrugated tubing that is placed over the connectors and secured to a furcation plug provided at the terminated end of the fiber optic cable. The pulling sleeve is then positioned over the corrugated tubing, secured to the furcation plug or the fiber optic cable, and advanced by hand through the conduit or under the raised floor using a rope attached to the pulling loop. Following installation of the fiber optic cable, the pulling sleeve and the corrugated tubing are disengaged and slid down the cable to expose the fiber optic connectors. The corrugated tubing, however, has a tendency to snag the connectors as it slides down the cable and thereby potentially damage the connectors and/or the respective optical fibers. Since they may be reused to reinstall the cable, the pulling sleeve and the corrugated tubing typically remain on the fiber optic cable following the initial installation, with the result that the pulling sleeve and the corrugated tubing take up a significant amount of the available volume under the raised floor. U.S. Pat. No. 5,863,083, assigned to the assignee of the present invention, describes an improved pulling grip that remedies the problems encountered with a protective housing consisting of corrugated tubing. The improved pulling grip includes a molded clamshell style pulling grip housing 6 having a plurality of slots 42 for temporarily retaining a plurality of fiber optic connectors 20 mounted on the ends of respective optical fibers 18 of a fiber optic cable 22. A pulling grip mesh 2 having a pulling loop 4 at one end is positioned over the pulling grip housing 6 with the fiber optic connectors 20 retained within the corresponding slots 42. The open end of the pulling grip mesh 2 is secured around a cable collar (furcation plug) 46 provided at the terminated end of the fiber optic cable 22 and a rope 3 is tied to the pulling loop 4 such that the pulling grip can be advanced by hand through a small diameter conduit or under a raised floor. Once the fiber optic cable 22 is installed in the desired location, the pulling grip mesh 2 is removed from the fiber optic cable 22 and the pulling grip housing 6 is opened to access the fiber optic connectors 20. Next, the fiber optic connectors 20 are removed from the slots 42 and the fiber optic cable 22 is removed from the pulling grip housing 6. Finally, the fiber optic connectors 20 are connected to the optical equipment utilized at the customer premises and strain relieved by securing the cable collar 46 to the communications hardware available at the customer premises, such as a distribution frame or rack, or a cross-connect housing mounted on a distribution frame or rack. As a result, the fiber optic connectors 20 are not snagged during removal of the pulling grip housing 6, and the reusable pulling grip mesh 2 and pulling grip housing 6 are not stored in the available volume under the raised floor.

While the improved pulling grip alleviates potential damage to the connectors and their respective optical fibers, and increases the available volume under the raised floor, it introduces different deficiencies. In particular, assembling the pulling grip housing 6, the cable collar 46 and the fiber optic connectors 20 is time consuming and labor intensive. The cable collar 46 at the terminated end of the fiber optic cable 22 is secured to the end of one of the internal compartments 24, 26 of the pulling grip housing 6 by cable ties 50 (FIG. 1), and the fiber optic connectors 20 must be loaded individually into respective ones of the slots 42 formed in one of the internal compartments 24, 26 (FIG. 6 and FIG. 10). Alternatively, one of the internal compartments 24, 26 of the pulling grip housing 6 could include an adhesive surface 70 for temporarily securing the fiber optic connectors 20 and the optical fibers 18. Regardless, securing the cable collar 46 on the internal compartments 24, 26 and routing the optical fibers 18 and the fiber optic connectors 20 individually into the slots 42 of the pulling grip housing 6 unnecessarily increases the time, and thus the cost, required to assemble the pulling grip. Furthermore, the fiber optic connectors 20 can work free of the slots 42 or the adhesive surface 70 inside the pulling grip housing 6 and potentially be damaged. In addition, the clamshell style pulling grip housing 6 is relatively costly to mold, particularly when the length of the pulling grip housing 6 is extended to accommodate a fiber optic cable 22 comprising a large number of optical fibers 18 terminated with fiber optic connectors 20. Further, the cable collar 46 at the terminated end of the fiber optic cable 22 is not readily integrated with the communications hardware typically found in a data center installation, and in particular, is not readily integrated with a conventional distribution frame or rack, or with a cross-connect housing mounted on a distribution frame or rack. For example, the diameter of the cable collar 46 varies significantly for different types of fiber optic cables and the exterior surface of the cable collar 46 does not provide a readily accessible mounting surface. Finally, the improved pulling grip continues to utilize the prior art pulling grip mesh 2 to advance the pulling grip housing 6, fiber optic connectors 20 and fiber optic cable 22 through the conduit or under the raised floor. However, the pulling grip mesh 2 tends to contract in the radial direction and thereby transfer a significant portion of the pulling load directly onto the pulling grip housing 6 instead of the cable collar 46, which is preferably strain relieved to the strength members of the fiber optic cable 22.

It is therefore apparent a pulling grip is needed that overcomes the problems encountered with a protective housing consisting of flexible corrugated tubing, yet does not lend itself to the deficiencies associated with a pulling grip comprising a molded clamshell style pulling grip housing and a conventional pulling grip mesh. In that regard, what is needed is a pulling grip that eliminates potential damage to the optical fibers and to the fiber optic connectors mounted upon the optical fibers, and does not take up any of the available volume under the raised floor of a data center. At the same time, loading the fiber optic connectors into the pulling grip should not be overly time consuming and labor intensive and the fiber optic connectors should be securely retained within the pulling grip housing during installation of the fiber optic cable. The pulling grip housing should also be cost effective to mold, even when its length is extended to accommodate a fiber optic cable comprising a large number of optical fibers terminated with fiber optic connectors. Furthermore, the terminated end of the fiber optic cable should be adapted to be readily integrated with the communications hardware typically found in a data center, such as a conventional distribution frame or rack, or a cross-connect housing mounted on a distribution frame or rack. Finally, the pulling grip should not utilize a conventional pulling grip mesh that contracts radially when pulled to advance the pulling grip housing, fiber optic connectors and fiber optic cable through a small diameter conduit or under a raised floor.

SUMMARY OF THE INVENTION

The above described problems and deficiencies associated with the known pulling grips for installing a pre-connectorized fiber optic cable are overcome by a pulling grip according to the present invention. In particular, the invention provides a pulling grip for installing a pre-connectorized fiber optic cable that includes a pulling grip housing and a pulling grip sleeve that do not remain on the fiber optic cable after installation, and thus do not take up any of the available volume under a raised floor. Further, the pulling grip housing is not time consuming or labor intensive to load, securely retains the fiber optic connectors and the furcation plug during installation, and does not snag the fiber optic connectors when removed. The pulling grip housing is not costly to mold and is not more flexible in the lengthwise direction than desired so that the pulling grip housing does not bend or kink about the transverse axis. In addition, the furcation plug of the pulling grip is readily integrated with a conventional distribution frame or rack, or with a cross-connect housing mounted on a distribution frame or rack. Furthermore, the pulling grip does not utilize a pulling grip sleeve made of a mesh material that contracts radially when pulled and thus transfers the tensile pulling force onto the pulling grip housing. Instead, the removable pulling grip sleeve is made of a fabric material and includes means for transferring the tensile pulling force onto the furcation plug that is strain relieved to the fiber optic cable.

In one advantageous embodiment, a pulling grip according to the invention includes a pulling grip sleeve, a molded clamshell style pulling grip housing and a furcation plug attached to the terminated end of a fiber optic cable having fiber optic connectors mounted upon the ends of respective optical fibers. The pulling grip housing has a first housing portion that defines an elongate channel for routing the optical fibers and a second housing portion that defines a plurality of pockets for storing the fiber optic connectors. The pulling grip sleeve includes an elongate, flexible bag that is provided with an opening at one end and a handle at the opposite end. The bag is slit lengthwise from the opening in the direction of the handle and is adapted to be opened and closed, for example by a zipper extending lengthwise from the opening substantially to the handle. The opened bag is positioned over the pulling grip housing and the furcation plug and the zipper is retracted towards the opening to close the bag around the pulling grip housing and the furcation plug. Once the fiber optic cable is installed, the zipper is extended towards the handle to open the bag and the pulling grip housing and the furcation plug are removed from the pulling grip sleeve. Accordingly, the pulling grip sleeve is removable and reusable, yet does not take up any of the available volume under the raised floor of a data center.

In another advantageous embodiment, a pulling grip according to the invention includes a pulling grip sleeve, a molded clamshell style pulling grip housing and a furcation plug attached to the terminated end of a fiber optic cable having fiber optic connectors mounted upon the ends of respective optical fibers. The pulling grip sleeve includes an elongate, flexible bag that is provided with an opening at one end and a handle at the opposite end. The pulling grip housing has a first housing portion defining an elongate channel for routing the optical fibers and a second housing portion defining a plurality of pockets that each stores a plurality of the fiber optic connectors. The plurality of fiber optic connectors stored in each pocket are bundled together and retained by a wrap that extends around the bundle of fiber optic connectors. The wrap is made of a generally planar sheet of flexible material having means for securing the opposed ends of the wrap to form an elongate, hollow cylinder encompassing the bundle of fiber optic connectors.

In another advantageous embodiment, a pulling grip according to the invention includes a pulling grip sleeve, a molded clamshell style pulling grip housing and a furcation plug attached to the terminated end of a fiber optic cable having fiber optic connectors mounted upon the ends of respective optical fibers. The pulling grip sleeve includes an elongate, flexible bag that is provided with an opening at one end and a handle at the opposite end. The pulling grip housing has a first housing portion defining an elongate channel for routing the optical fibers and a second housing portion defining a plurality of pockets for storing the fiber optic connectors. The pulling grip housing may be molded as a single structure, or alternatively, may be formed from a plurality of individually molded modules connected together by two or more flexible metal rods that are received within lengthwise openings provided in the first housing portion or the second housing portion. The modules consist of a plug end module, one or more connector modules and a nose end module. The modularity of the pulling grip housing permits bending while maintaining the integrity of the pulling grip housing regardless of the number of connector modules utilized in the pulling grip. In addition, the modules may be injection molded to reduce complexity and manufacturing cost.

In another advantageous embodiment, a pulling grip according to the invention includes a furcation plug attached to a terminated end of a fiber optic cable having at least one fiber optic connector mounted upon the end of a respective optical fiber. The furcation plug includes an elongate, tubular epoxy shell for receiving the terminated end of the fiber optic cable and means for securing the terminated end of the fiber optic cable and at least a portion of the optical fiber within the epoxy shell. The furcation plug further includes means for integrating the furcation plug with conventional communication hardware, such as a distribution frame or rack or a cross-connect housing mounted on a distribution frame or rack. In a first embodiment, means for integrating is at least one groove on the exterior surface of the epoxy shell for engaging a mounting bracket provided on the communications hardware. In a second embodiment, the means for integrating is at least one channel on the exterior surface of the epoxy shell for engaging a mounting stud provided on the communications hardware. In a third embodiment, the means for integrating is at least one ear on the exterior surface of the epoxy shell that has an opening for receiving a mounting fastener provided on the communications hardware.

In another advantageous embodiment, a method for installing a pre-connectorized fiber optic cable having a terminated end with at least one fiber optic connector mounted upon the end of a respective optical fiber according to the invention method includes providing a furcation plug attached to the terminated end of the fiber optic cable. The method further includes providing a pulling grip housing for receiving and temporarily encasing the fiber optic connectors, the optical fibers and at least a portion of the furcation plug. The method further includes providing a pulling grip sleeve that is adapted to be opened and closed. The opened pulling grip sleeve is positioned over the pulling grip housing and the furcation plug, and is then closed around the pulling grip housing and the furcation plug. The pulling grip sleeve is then pulled through a small diameter conduit or under the raised floor of a data center. The pulling grip sleeve is then removed from the pulling grip housing, the furcation plug and the fiber optic cable after the fiber optic cable is installed. Finally, the furcation plug and the fiber optic connectors are removed from the pulling grip housing.

In another advantageous embodiment, a method for loading a pulling grip with fiber optic connectors mounted upon the ends of respective optical fibers of a pre-connectorized fiber optic cable having a terminated end according to the invention includes providing a pulling grip housing having a first housing portion defining an elongate channel for routing the optical fibers and a second housing portion defining a plurality of pockets for storing the fiber optic connectors. The method further includes routing the optical fibers lengthwise from the terminated end of the fiber optic cable within the channel and into one of the pockets such that the pocket stores a plurality of the fiber optic connectors. According to one embodiment, the first housing portion comprises a continuous first flange and at least two discontinuous second flanges, and the optical fibers are routed underneath the first flange and at least some of the second flanges, between adjacent second flanges and across the hinge line into the pocket. Preferably, the plurality of fiber optic connectors stored in the pocket are bundled together and encompassed by a cylindrical wrap. The method further includes providing the pulling grip housing with a hinge line separating the first housing portion and the second housing portion, and folding the first housing portion and the second housing portion together to encase the fiber optic connectors and the optical fibers within the pulling grip housing.

BRIEF DESCRIPTION OF THE DRAWINGS

The above described and other features, aspects, and advantages of the present invention are better understood when the following detailed description of the invention is read with reference to the accompanying drawings, wherein:

FIG. 1A is an exploded perspective view of a pulling grip mounted upon a fiber optic cable in accordance with an exemplary embodiment of the present invention;

FIG. 2A is a top view of the pulling grip of FIG. 1A shown with the pulling grip housing in the open configuration and the pulling grip sleeve removed for purposes of clarity;

FIG. 2B is a side view of the pulling grip of FIG. 1A shown with the pulling grip housing in the closed configuration and the pulling grip sleeve removed for purposes of clarity;

FIG. 2C is a perspective view of an alternative embodiment of a pulling grip in accordance with the present invention including a modular pulling grip housing;

FIG. 2D is an enlarged cross sectional view of a connector module of the modular pulling grip housing of FIG. 2C taken along the line 2D—2D;

FIG. 3A is an enlarged cross sectional view illustrating a first exemplary embodiment of a furcation plug of the pulling grip of FIG. 1A mounted upon a first exemplary fiber optic cable;

FIG. 3B is an enlarged cross sectional view of the first fiber optic cable of FIG. 3A taken along the line 3B—3B;

FIG. 8A is a perspective view illustrating the furcation plug of FIG. 7 integrated with a conventional distribution frame or rack utilizing the second means for integrating; and FIG. 8B is a perspective view illustrating the furcation plug of FIG. 7 integrated with a conventional distribution frame or rack utilizing the third means for integrating.

DETAILED DESCRIPTION OF THE INVENTION

Figure 1B:
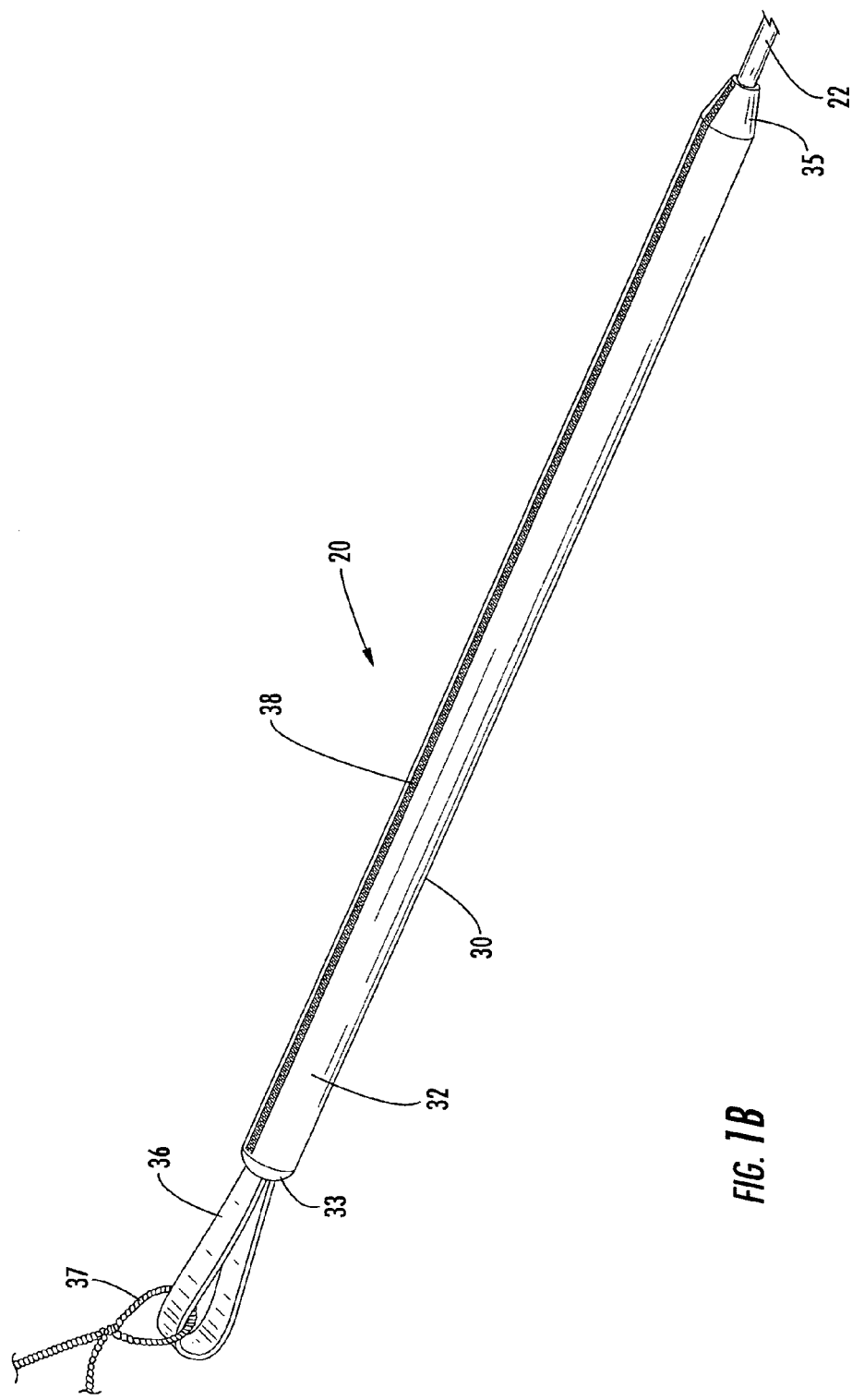
FIG. 1B is a perspective view of the pulling grip of FIG. 1A shown in the fully assembled configuration.

The present invention will be described more fully hereinafter with reference to the accompanying drawings, in which exemplary embodiments of the invention are shown, including the embodiment presently contemplated by the inventors as being the best mode for practicing the invention. The invention may, however, be embodied in many different forms and should not be construed as being limited to the embodiments set forth herein. Instead, these exemplary embodiments are shown and described so that this disclosure will be thorough and complete, and will fully convey the scope of the invention to those skilled in the art. Like reference numbers refer to like elements throughout the detailed description and the various drawings.

Referring now to the accompanying drawings, FIGS. 1A, 1B, 2A and 2B show a pulling grip, indicated generally at 20, according to an exemplary embodiment of the present invention. The illustrated embodiment of the pulling grip 20 comprises a pulling grip sleeve 30, a pulling grip housing 40 and a furcation plug 60 mounted upon the terminated end of a fiber optic cable 22. The fiber optic cable 22 comprises at least one, and preferably, a plurality of optical fibers 24 having at least one, and preferably, a corresponding plurality of fiber optic connectors 28 mounted upon the ends of respective ones of the optical fibers 24. The fiber optic cable 22 may be any type of optical communications cable, for example a trunk cable serving a data center in an office building, that must be installed through a small diameter conduit or under a raised floor. Furthermore, the fiber optic cable 22 may have any construction known or hereafter devised, and may comprise any number of optical fibers 24. Typically, however, the fiber optic cable 22 is an indoor optical cable comprising up to twelve subunits 23 (see FIG. 3B) or fiber ribbons 25 (see FIG. 3D) each containing up to twelve optical fibers 24 and surrounded by a sheath, or outer jacket 27, as will be described in greater detail below. The exemplary fiber optic cables 22 shown in FIG. 3B and FIG. 3D comprise six subunits 23 or fiber ribbons 25, and each subunit 23 or ribbon 25 contains six optical fibers 24. However, the construction of the fiber optic cables 22 depicted herein is selected for purposes of convenience only and should not be construed as limiting the invention in any manner. At one terminated end, the fiber optic cable 22 is pre-connectorized. As used herein, the term "pre-connectorized" is intended to mean that at least one optical fiber 24 is terminated to a respective fiber optic connector 28 prior to installation of the fiber optic cable 22 through the conduit or under the raised floor. Preferably, each of the optical fibers 24 is terminated to a respective one of the fiber optic connectors 28 in the factory (i.e., "factory-connectorized"). However, the optical fibers 24 may also be terminated to the respective fiber optic connectors 28 at the customer premises (i.e., "field-connectorized") prior to installation of the fiber optic cable 22. A suitable fiber optic cable 22 for use with the pulling grips 20 shown and described herein is an all-dielectric, 36 fiber MIC® Unitized Riser Cable available from Corning Cable Systems LLC of Hickory, N.C.

The pulling grip sleeve 30 comprises an elongate, flexible bag 32 that is provided with an opening 34 at one end and a handle 36 at the opposite end. The bag 32 is made of a lightweight, compliant material, such as woven canvas or polyester fabric. The bag 32 is slit lengthwise from the opening 34 in the direction of the handle 36 and the bag 32 is adapted to be opened and closed in any suitable manner, for example by VELCRO® material or a reusable pressure sensitive adhesive. As shown, the bag 32 is opened and closed by a zipper 38 that extends lengthwise from the opening 34 substantially to the handle 36. In operation, the zipper 38 is extended towards the handle 36 to open the bag 32 and the bag 32 is positioned over the pulling grip housing 40 and the furcation plug 60. The zipper 38 is then retracted towards the opening 34 to close the bag 32 around the pulling grip housing 40 and the furcation plug 60. The nose end portion 33 of the bag 32 immediately adjacent the handle 36 may be open, but preferably is closed such that the bag 32 defines a dome shaped cover. Thus, the bag 32 completely encases the pulling grip housing 40 and all but the rear of the furcation plug 60 when the zipper 38 is retracted. As a result, the pulling grip housing 40 and the front of the furcation plug 60 are protected from dust, dirt, debris and moisture that may be present when the pulling grip 20 is advanced through a small diameter conduit or under a raised floor. The bag 32 further comprises a plug end portion 35 immediately adjacent the opening 34 that is tapered and engages the rear of the furcation plug 60 to transfer a tensile pulling force from the bag 32 to the furcation plug 60. One or more retaining plates (not shown) made of metal or stiff plastic may be provided on the interior surface of the tapered plug end portion 35 to strengthen the bag 32 locally and to transfer the tensile pulling force from the bag 32 evenly over the rear of the furcation plug 60. The handle 36 is provided to enable a field technician to pull the pulling grip sleeve 30, and hence the pulling grip housing 40, the furcation plug 60 and the fiber optic cable 22, by hand when installing the fiber optic cable 22 under a raised floor in a data center. Alternatively, the handle 36 may provide a pulling loop for engaging a rope 37 (FIG. 1B) that is used to pull the pulling grip 20 and the fiber optic cable 22 through a small diameter conduit, for example between rooms in an office building or between different office buildings served by the data center. The handle 36 provides an advantage over an existing pulling loop formed by an open end of the bag that is closed by a buckle. The one-piece handle 36 is preferably formed as a permanently closed loop since the end of the bag 32 adjacent the handle 36 need not be opened to access the fiber optic connectors 28 or to slide the pulling grip sleeve 30 down the fiber optic cable 22. Because the pulling sleeve 30 is easily removable without damaging the fiber optic connectors 28 or the optical fibers 24, it need not remain on the fiber optic cable 22 after installation in order to be reusable.

As shown in FIG. 1A and FIG. 2A, the pulling grip housing 40 is a clamshell style structure comprising a first housing portion 42 and a second housing portion 44 separated by a hinge line 43. The pulling grip housing 40 is molded, for example by compression or injection molding, to any desired length and diameter and is made of a flexible material such as rubber or plastic. For example, the pulling grip housing 40 may be made of open-cell polyurethane foam. Preferably, however, the pulling grip housing 40 is made of Kraton® thermoplastic polymer available from Shell Oil Company of Houston, Tex. The Kraton® material has been found to provide suitable flexibility for the pulling grip 20 to be wound around a cable reel for shipping and storing the fiber optic cable 22. At the same time, the Kraton® material provides sufficient rigidity to prevent the pulling grip housing 40 from over-bending and kinking unless the length of the pulling grip housing 40 is substantially increased, as will be discussed. As shown in FIG. 2A and FIG. 2B, the pulling grip housing 40 is compression molded as a unitary structure having a length sufficient to encase a fiber optic cable 22 terminated to up to 36 fiber optic connectors 28 mounted upon respective optical fibers 24. Alternatively, as shown in FIG. 2C and FIG. 2D, the pulling grip housing 40' is injection molded or extruded as a modular clamshell style structure comprising a plurality of relatively short, overlapping modules interconnected by flexible metal rods to prevent over-bending and kinking. For example, the pulling grip housing 40 may comprise a plug end module 46a, one or more connector modules 46b and a nose end module 46c connected together by two or more flexible, relatively small diameter metal rods 45 that are received within lengthwise openings 47 (FIG. 2D) provided in the second housing portion 44. The modularity of the pulling grip housing 40' permits localized bending while maintaining the rigidity of the individual modules 46a, 46b, 46c (i.e., the modules act like the links of a chain), regardless of the number of connector modules 46b utilized in the pulling grip housing 40'. Furthermore, the pulling grip housing 40' may be customized to comprise the appropriate number of connector modules 46b suitable for a predetermined number of fiber optic connectors 28 mounted upon the optical fibers 24 of a particular fiber optic cable 22. Injection molding the individual modules 46a, 46b, 46c provides the additional advantage of reducing the complexity and manufacturing cost associated with molding the pulling grip housing 40' as compared to compression molding the pulling grip housing 40.

As shown, the first housing portion 42 of the pulling grip housing 40, 40' defines an elongate channel 52 for receiving the furcation plug 60 and the optical fibers 24 of the subunits 23, or the fiber ribbons 25, of the fiber optic cable 22. Similarly, the second housing portion 44 of the pulling grip housing 40, 40' defines at least one, and preferably, a plurality of pockets 54 for receiving the fiber optic connectors 28, as will be described.

The furcation plug 60 is positioned within the channel 52 of the first housing portion 42 with the fiber optic cable 22 extending therefrom. As best shown in FIG. 2A and FIG. 2C, the furcation plug 60 has at least one groove 61 that extends at least partially along the periphery of the exterior surface of the epoxy shell 62. The first housing portion 42 and the second housing portion 44 each comprise a ridge 41 that engages the groove 61 to securely retain the epoxy shell 62 between the first and second housing portions 42, 44 when the pulling grip housing 40, 40' is closed. Thus, the furcation plug 60 does not have a tendency to move lengthwise within the first housing portion 42 while the fiber optic connectors 28 and the optical fibers 24 are being loaded into the pulling grip 20, or to move lengthwise within the pulling grip housing 40, 40' while the pulling grip 20 is being advanced through a conduit or under a raised floor. Further, each ridge 41 and groove 61 cooperate to restrain rotation of the furcation plug 60 and the optical fibers 24 or the fiber ribbons 25 relative to the pulling grip housing 40. The optical fibers 24 of each subunit 23 and each fiber ribbon 25 are routed within the channel 52 from the furcation plug 60 lengthwise along the first housing portion 42 a sufficient distance to take-up any slack length of the optical fibers 24 or fiber ribbon 25 between the furcation plug 60 and the appropriate pocket 54 formed in the second housing portion 44 for receiving the fiber optic connectors 28 mounted upon the optical fibers 24. The subunits 23 containing the optical fibers 24 or the fiber ribbons 25 may be routed substantially the entire distance from the furcation plug 60 to the corresponding pocket 54. Typically, as shown and described herein, each subunit 23 is terminated by a ring cut within the furcation plug 60 and the optical fibers 24 from the subunit 23 are spiral wrapped a sufficient distance so that the optical fibers 24 of a particular subunit 23 remain grouped together. The fiber optic connectors 28 mounted upon the optical fibers 24 of each subunit 23 or fiber ribbon 25 are mounted at a predetermined distance from the terminated end of the fiber optic cable 22. Thus, the fiber optic connectors 28 mounted upon each subunit 23 or fiber ribbon 25 may be grouped together and stowed within the corresponding pocket 54 defined by the second housing portion 44. As shown, the first housing portion 42 may further comprise a plurality of retaining flanges 56 (FIG. 1A) for retaining the optical fibers 24 or the fiber ribbons 25 within the channel 52 between the furcation plug 60 and the corresponding pocket 54.

FIG. 2A illustrates an exemplary routing of six spiral wrapped optical fibers 24 and the respective fiber optic connectors 28 between the furcation plug 60 and the pocket 54 closest to the fiber optic cable 22. The spiral wrapped optical fibers 24 are routed in the channel 52 defined by the first housing portion 42 away from the furcation plug 60 in the lengthwise direction. The optical fibers 24 are routed under the continuous flange 56a a sufficient distance and then routed back towards the furcation plug 60 under the discontinuous flanges 56b to the appropriate pocket 54 in the second housing portion 44. The transverse width of the first housing portion 42 is selected to be sufficient so as to not exceed the minimum bend radius of the optical fibers 24. The optical fibers 24 are then routed between adjacent flanges 56b and across the hinge line 43 from the first housing portion 42 to the second housing portion 44 such that the fiber optic connectors 28 are stored within the pocket 54 closest to the terminated end of the fiber optic cable 22. The remaining optical fibers 24 and the respective fiber optic connectors 28 are likewise routed and stored in groups of six within the remaining pockets 54 in a staggered manner outwardly from the terminated end of the fiber optic cable 22. Since the optical fibers 24 are routed and the fiber optic connectors 28 are stored in groups of six rather than individually, it is relatively quick and easy for a field technician to load the optical fibers 24 and the fiber optic connectors 28 into the pulling grip housing 40, 40' prior to inserting the housing 40, 40' into the pulling grip sleeve 30. Furthermore, it is less likely that the fiber optic connectors 28 will move inside the pulling grip housing 40, 40' and potentially be damaged while the pulling grip is being pulled through a small diameter conduit or under a raised floor. Once the furcation plug 60 is positioned within the first housing portion 42 and the optical fibers 24 and fiber optic connectors 28 of the fiber optic cable 22 are loaded into the pulling grip housing 40, 40' in the manner described above, the first housing portion 42 and the second housing portion 44 are folded about the hinge line 43 and secured together to encase the furcation plug 60 and the fiber optic connectors 28. The first housing portion 42 and the second housing portion 44 may be secured together in any suitable manner, and in fact, need not be secured together in any manner if the pulling grip housing 40, 40' is loaded and then immediately inserted into the pulling grip sleeve 30. As shown in FIG. 2A, the first housing portion 42 may comprise a tongue 48 that engages a corresponding groove 49 formed in the second housing portion 44 to secure the first housing portion 42 and the second housing portion 44 together in a "tongue-and-groove" style mating configuration. Alternatively, as shown in FIG. 2D, the tongue 48 and the groove 49 may be formed as a "dovetail" style mating configuration. Also, the locations of the tongue 48 and the groove 49 may be reversed. Regardless, the configurations of the tongue 48 and the groove 49 depicted herein are merely exemplary and the first housing portion 42 and the second housing portion 44 may comprise any conventional securing means. For example, a lengthwise strip of a pressure sensitive adhesive may be provided on one or both of the first and second housing portions 42, 44. Further, the first and second housing portions 42, 44 may be secured together by external means, such as by a wrap, one or more elastic bands, cable ties, or adhesive tape. Once the first and second housing portions 42, 44 are secured together, the pulling grip sleeve 30 is positioned over the furcation plug 60 and the pulling grip housing 40, 40' with the fiber optic cable 22 extending rearwardly from the furcation plug 60.

A first exemplary embodiment of a furcation plug 60 for use with the pulling grip housing 40, 40' is shown in FIG. 3A and FIG. 3B. The furcation plug 60 is shown mounted upon a first exemplary fiber optic cable 22. The fiber optic cable 22 comprises a plurality of thin-walled subunits 23 made of a plastic material, such as PVC, that are helically twisted and stranded together. The subunits 23 are positioned symmetrically about a dielectric central member 29 made of a relatively rigid material, for example hard plastic or composite material. The fiber optic cable 22 typically comprises between three and twelve stranded subunits, and as shown, comprises a total of six subunits 23. Each such subunit 23 contains a plurality of optical fibers 24 that are preferably coated with a thin plastic jacket, for example TBII® 900 micron tight buffered optical fiber available from Corning Cable Systems LLC of Hickory, N.C. A subunit 23 typically contains between two and twelve optical fibers 24, and as shown, contains six optical fibers 24. The subunits 23 and the central member 29 are encased by a relatively thick-walled outer jacket 27 made, for example, of a flame-retardant hard plastic or composite material. The fiber optic cable 22 may further comprise a plurality of lengthwise extending dielectric strength members (not shown) within the subunits 23 and/or the outer jacket 27 that are made of a relatively high strength, high stiffness plastic or composite, such as graphite reinforced plastic or KEVLAR® aramid fiber. The fiber optic cable 22 may also comprise one or more lengthwise extending ripcords (not shown) within the subunits 23 and/or the outer jacket 27 for opening the subunits 23 or the outer jacket 27, respectively.

The fiber optic cable 22 is terminated (i.e., the outer jacket 27, the ripcords, the central member 29 and the jacket and strength members of each subunit 23 are cut off) and the optical fibers 24 of each subunit 23 are gathered together within the furcation plug 60. As shown in FIG. 3A, the furcation plug 60 comprises from front to rear (i.e., from left to right) an epoxy shell 62, a back nut 64, a heat shrink 66 made of a heat-deformable polyolefin material, and a bushing 68 in the form of a truncated cone that is retained by a shoulder provided at the rear of the back nut 64. The terminated end of the fiber optic cable 22 is inserted through the bushing 68 and the back nut 64 and into the rear of the epoxy shell 62. Typically, the outer jacket 27 and the subunits 23 (only one shown) are ring cut in a known manner and the portions of the outer jacket 27 and the subunits 23 forward of the ring cut are discarded to expose predetermined lengths of the optical fibers 24. The outer jacket 27 and the subunits 23 may be cut at the same location within the interior of the epoxy shell 62, or as shown, the subunits 23 may be cut at a location slightly beyond the cut end of the outer jacket 27, and if desired, even beyond the end of the epoxy shell 62. Similarly, the central member 29 may be cut at the same location as the cut end of the outer jacket 27, but preferably is terminated a relatively short distance beyond the outer jacket 27 within the epoxy shell 62 so that the central member 29 extends substantially through the interior of the epoxy shell 62. The optical fibers 24 of each subunit 23 are wrapped with spiral wrap 69 for a sufficient distance from the cut end of the outer jacket 27 such that the optical fibers 24 of the subunit 23 remain grouped together. Preferably, the spiral wrap 69 continues on the optical fibers 24 a short distance of about four to six inches beyond the front end of the epoxy shell 62. If desired, a relatively short length of heat-deformable polyolefin material (not shown) may be used to transition between the end of each subunit 23 and the beginning of the spiral wrap 69. The fiber optic connectors 28 are next mounted upon the optical fibers 24 in any conventional manner now known or hereafter devised. The transition between the rear end of the epoxy shell 62 and the outer jacket 27 of the fiber optic cable 22 is sealed with the heat shrink 66 in a known manner, and the back nut 64 and the bushing 68 retained by the shoulder on the rear of the back nut 64 are secured to the epoxy shell 62 by a fastener, such as a self-tapping set screw 65. Finally, the interior of the epoxy shell 62 is filled with a viscous epoxy 67 that hardens within the epoxy shell 62 around the outer jacket 27 of the fiber optic cable 22, the spiral wrapped subunits 23 and the central member 29 to seal the epoxy shell 62 from dust, dirt, debris and moisture, and to strain relieve the epoxy shell 62 to the fiber optic cable 22.

Figures 3C, 3D:
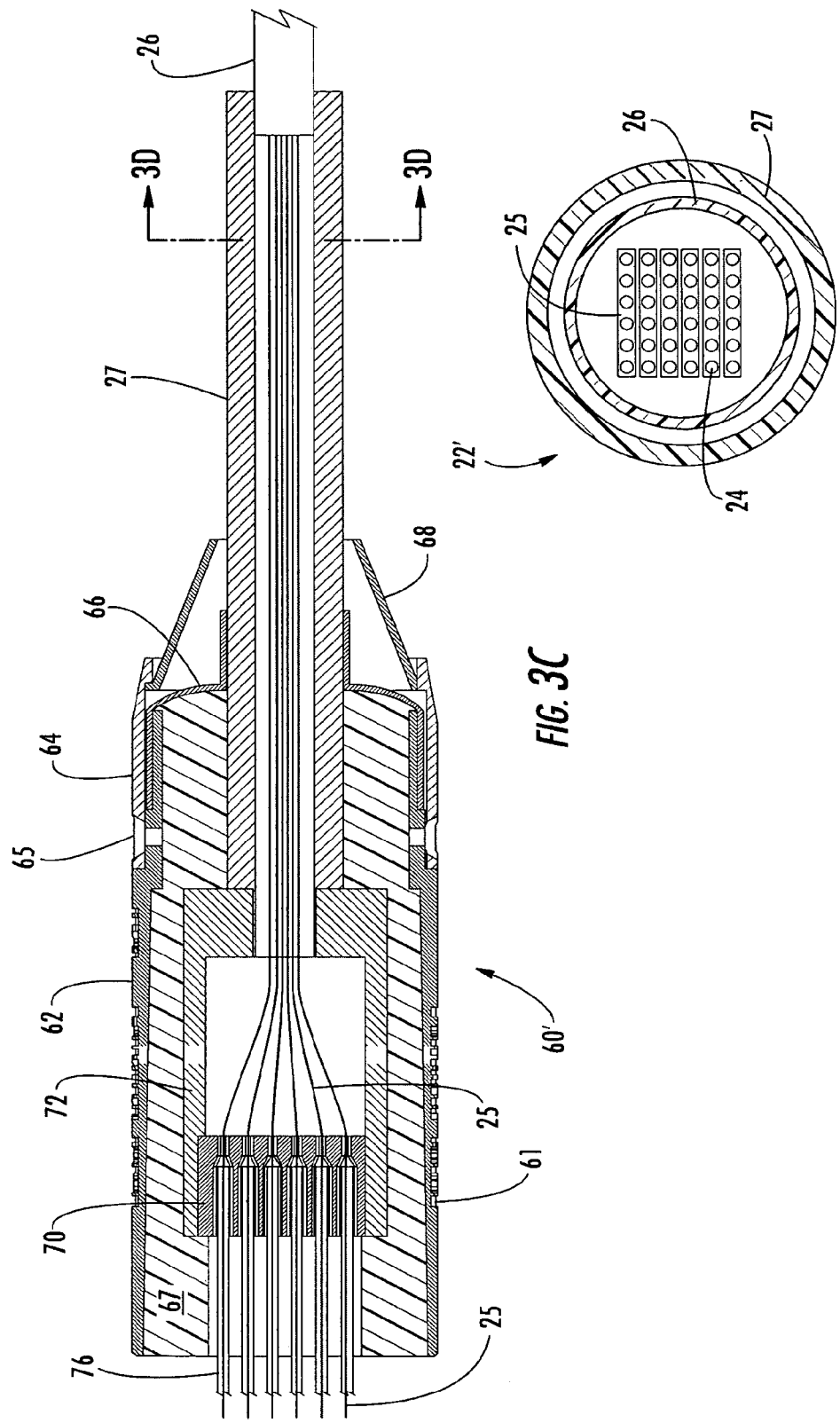
FIG. 3C is an enlarged cross sectional view illustrating a second exemplary embodiment of a furcation plug of the pulling grip of FIG. 1A mounted upon a second exemplary fiber optic cable.
FIG. 3D is an enlarged cross sectional view of the second fiber optic cable of FIG. 3C taken along the line 3D—3D.
Figure 4:
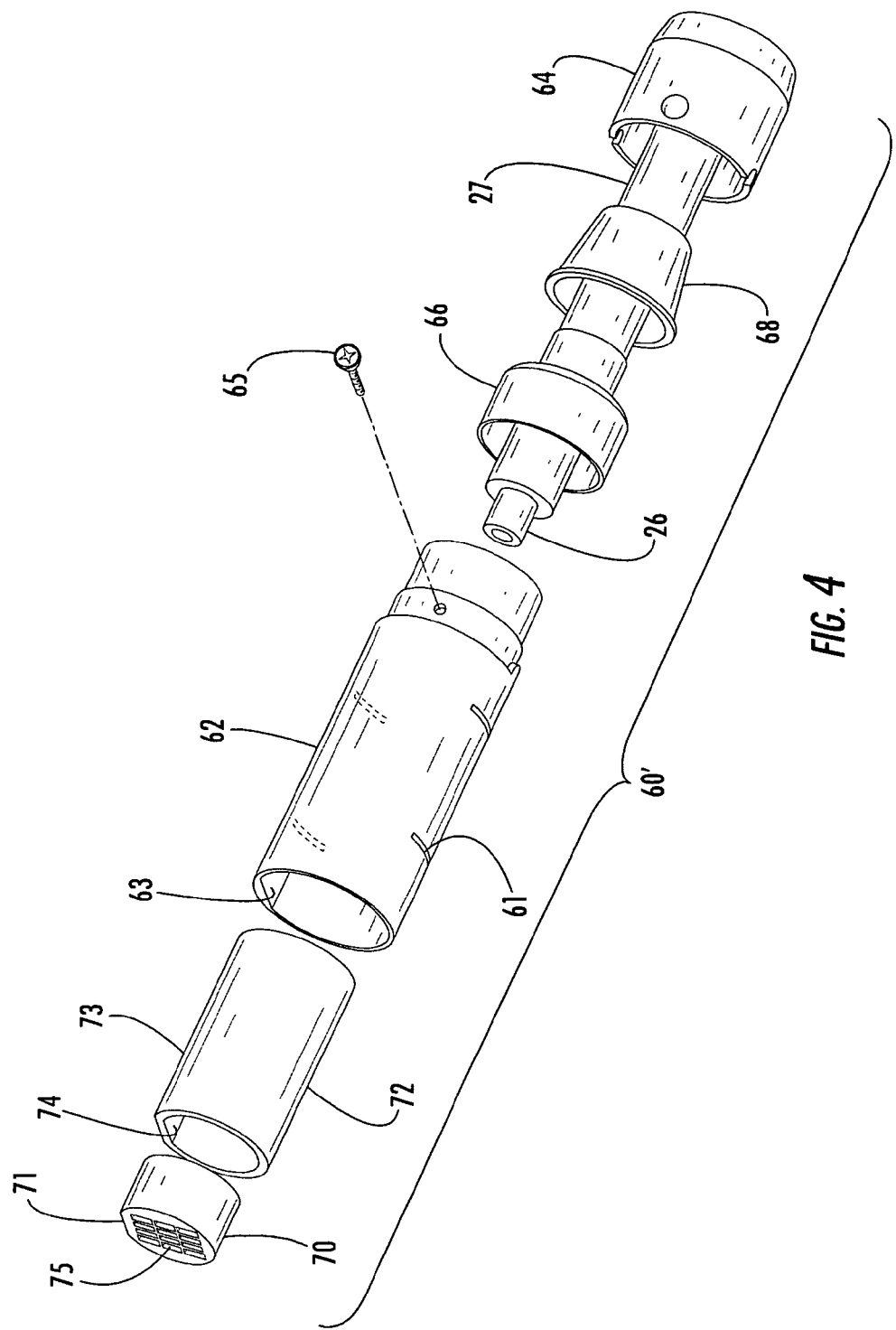
FIG. 4 is an exploded perspective view of the furcation plug of FIG. 3C.

A second exemplary embodiment of a furcation plug 60' for use with the pulling grip housing 40, 40' is shown in FIG. 3C, FIG. 3D and FIG. 4. The furcation plug 60' is shown mounted upon a second exemplary fiber optic cable 22'. The fiber optic cable 22' comprises a plurality of subunits 25, and more particularly, a plurality of thin, rectangular fiber ribbons 25 that are stacked one on top of another in the radial direction and covered by a helically wound KEVLAR® wrap or a thin core tube 26 made of a dielectric material, such as plastic or composite. The fiber optic cable 22' typically comprises between three and twelve subunits, and as shown, comprises a total of six fiber ribbons 25. Each fiber ribbon 25 contains a plurality of optical fibers 24 encased within a resin matrix material of the fiber ribbon types available from Corning Cable Systems LLC of Hickory, N.C. Each fiber ribbon 25 typically contains between two and twelve optical fibers 24, and as shown, contains a total of six optical fibers 24. The fiber ribbons 25 and the core tube 26 are encased by a relatively thick-walled outer jacket 27 made, for example, of a flame-retardant hard plastic, thermoplastic or composite material. The fiber optic cable 22' may further comprise a plurality of lengthwise extending dielectric strength members (not shown) within the outer jacket 27 that are made of a relatively high strength, high stiffness plastic or composite, such as graphite reinforced plastic or KEVLAR® aramid fiber. The fiber optic cable 22' may also comprise one or more lengthwise extending ripcords (not shown) within the core tube 26 and/or the outer jacket 27 for opening the core tube 26 or the outer jacket 27, respectively.

The fiber optic cable 22' is terminated (i.e., the outer jacket 27, any strength members and/or ripcords, and the core tube 26 are cut off), and the optical fibers 24 of each fiber ribbon 25 are gathered together within the furcation plug 60'. As shown exploded in FIG. 4 and assembled in FIG. 3C, the furcation plug 60' comprises from front to rear (i.e., from left to right in FIG. 3C) an epoxy shell 62, a ribbon cable transition element 70, a ribbon cable transition sleeve 72, a back nut 64, a heat shrink 66 made of a heat-deformable polyolefin material, and a bushing 68 in the form of a truncated cone that is retained by a shoulder provided at the rear of the back nut 64. The terminated end of the fiber optic cable 22' is inserted through the bushing 68 and the back nut 64 and into the rear of the epoxy shell 62 until the front end of the outer jacket 27 abuts the rear end of the transition sleeve 72 with the core tube 26 protruding slightly into the transition sleeve 72. The portions of the outer jacket 27 and the core tube 26 forward of the ring cut are then discarded to expose predetermined lengths of the fiber ribbons 25. The ends of the outer jacket 27 and the core tube 26 may be cut at the same location within the interior of the epoxy shell 62, or as shown, the core tube 26 may be cut at a location slightly beyond the cut end of the outer jacket 27. Similarly, any strength members and/or the ripcords may be cut at the same location as the cut end of the outer jacket 27, but preferably are terminated a relatively short distance beyond the cut end of the outer jacket 27. The fiber ribbons 25 are routed from the ribbon cable transition element 70 into rectangular fanout tubes 76 so that the fiber ribbons 25 are protected as they exit the epoxy shell 62. The fanout tubes 76 and the fiber ribbons 25 may be terminated and the optical fibers 24 transitioned into individual fanout tubes (not shown) a relatively short distance beyond the front end of the epoxy shell 62. The fiber optic connectors 28 are next mounted upon the optical fibers 24 in any conventional manner now known or hereafter devised. In another embodiment, the fanout tubes 76 and the fiber ribbons 25 are not terminated until the individual fiber ribbons 25 are routed within the channel 52 and terminated to a multifiber connector (not shown). Regardless, the ribbon cable transition element 70 and the fanout tubes 76 separate the fiber ribbons 25 exiting the furcation plug 60'. The transition between the rear end of the epoxy shell 62 and the outer jacket 27 of the fiber optic cable 22' is sealed with the heat shrink 66 in a known manner, and the back nut 64 and the bushing 68 retained by the shoulder on the rear of the back nut 64 are secured to the epoxy shell 62 by a fastener, such as a self-tapping set screw 65. Finally, the interior of the epoxy shell 62 is filled with a viscous epoxy 67 that hardens within the epoxy shell 62 around the outer jacket 27 of the fiber optic cable 22', the ribbon cable transition sleeve 72, the front face of the ribbon cable transition element 70, and the fanout tubes 76 containing the fiber ribbons 25 to seal the epoxy shell 62 from dust, dirt, debris and moisture, and to strain relieve the epoxy sell 62 to the fiber optic cable 22'.

As shown in FIG. 4, the ribbon cable transition sleeve 72 defines a generally cylindrical, tubular body that is sized and shaped to be received within the tubular epoxy shell 62. In particular, the outer diameter of the ribbon cable transition sleeve 72 is somewhat smaller than the inner diameter of the epoxy shell 62. Further, the exterior surface of the ribbon cable transition sleeve 72 comprises a first surface 73 and the interior surface of the ribbon cable transition sleeve 72 comprises a second surface 74. As shown, the first surface 73 and the third surface 63 are generally planar and opposite, but typically do not engage one another. The ribbon cable transition element 70 defines a generally cylindrical body that is sized and shaped to be received within the tubular ribbon cable transition sleeve 72. In particular, the outer diameter of the ribbon cable transition element 70 is substantially equal to the inner diameter of the ribbon cable transition sleeve 72. Further, the exterior surface of the ribbon cable transition element 70 comprises a fourth surface 71 that cooperates with the second surface 74 provided on the interior surface of the ribbon cable transition sleeve 72 to prevent relative rotation between the ribbon cable transition element 70 and the ribbon cable transition sleeve 72. Accordingly, the second surface 74 provided on the ribbon cable transition sleeve 72 engages the fourth surface 71 provided on the ribbon cable transition element 70 and cooperates with the epoxy 67 to prevent rotation of the ribbon cable transition element 70 relative to the epoxy shell 62. The ribbon cable transition element 70 further comprises a plurality of openings 75 to separate the fiber ribbons 25 of the fiber optic cable 22'. The ribbon cable transition element 70 may comprise between two and twelve openings 75. As shown, the ribbon cable transition element 70 comprises twelve openings 75 that are rectangular shaped for receiving the fanout tubes 76 and separating the fiber ribbons 25 of the fiber optic cable 22'. Accordingly, the fiber ribbons 25 and their respective fiber optic connectors 28 are quickly and easily routed within the channel 52 of the first housing portion 42 to the appropriate pocket 54 of the second housing portion 44 of the pulling grip housing 40, 40'.

Figure 5:
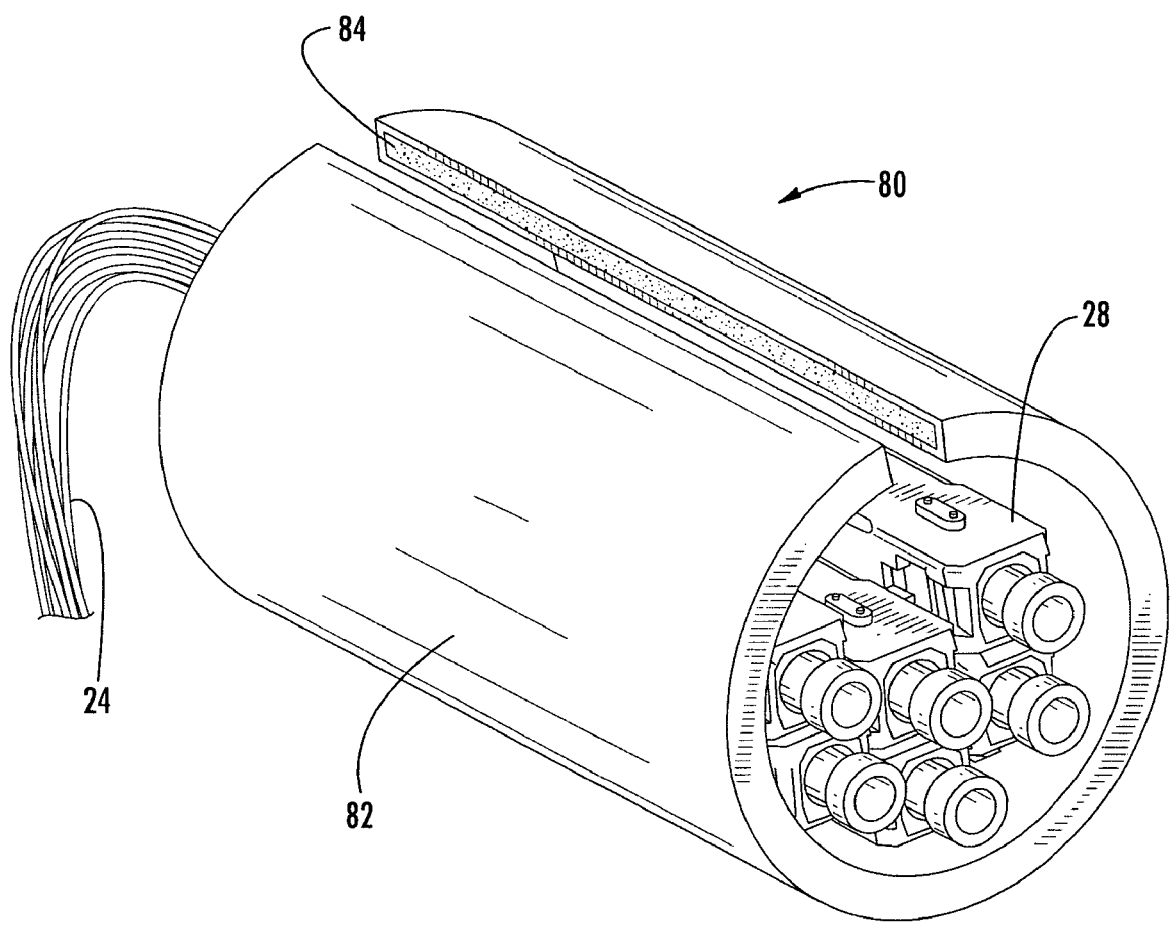
FIG. 5 is a perspective view illustrating a plurality of fiber optic connectors bundled together and enclosed by a cable wrap for insertion into a pocket of the pulling grip housing of FIG. 1A.

FIG. 5 shows an exemplary embodiment of a wrap 80 for encompassing the plurality of fiber optic connectors 28 stored within the pocket 54 of the second housing portion 44 of the pulling grip housing 40, 40'. The wrap 80 comprises a generally cylindrical body 82 that is slit lengthwise and adapted to be positioned around a plurality of the fiber optic connectors 28 arranged in a generally circular bundle. The body 82 is made of a material that is resilient, yet sufficiently flexible so that the body 82 can be opened to permit insertion of the fiber optic connectors 28. The body 82 may be made of any suitable plastic or composite material, but preferably is made of polyurethane or PVC foam. As shown, the body 82 is positioned around six single fiber SC style fiber optic connectors 28 available from Corning Cable Systems LLC of Hickory, N.C. mounted upon the ends of respective optical fibers 24. One or both of the lengthwise edges of the body 82 may be provided with a pressure sensitive adhesive 84 to secure the body 82 around the fiber optic connectors 28. As such, the wrap 80 may be reusable. However, any suitable means for securing the body 82 may be employed, for example, one or more elastic bands or cable ties, or a "tongue-and-groove" mating configuration. Use of the cylindrical wrap 80 to encompass and secure the bundle of fiber optic connectors 28 within the pocket 54 of the second housing portion 44 contributes to restraining the fiber optic connectors 28 from lengthwise movement and rotation within the pulling grip housing 40, 40' while the pulling grip 20 is being pulled through a small diameter conduit or under a raised floor, as previously described.

Figure 6:
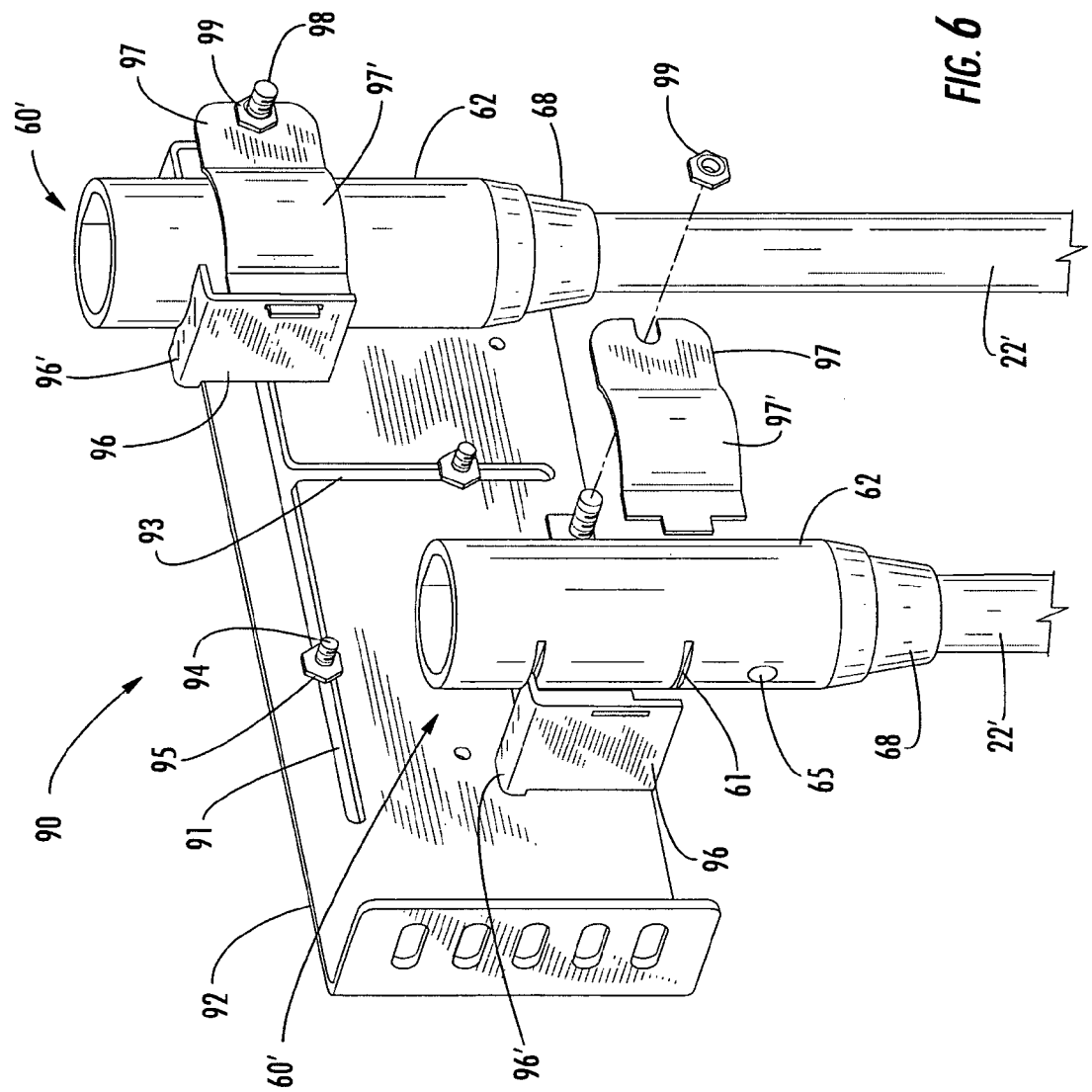
FIG. 6 is a partially exploded perspective view illustrating a first means for readily integrating the furcation plug of the pulling grip of FIG. 1A with conventional communications hardware in accordance with an exemplary embodiment of the present invention.

FIG. 6 illustrates a furcation plug 60' according to an exemplary embodiment of the present invention comprising a first means 90 for readily integrating the furcation plug 60' with communications hardware, such as a conventional distribution frame or rack, or a cross-connect housing on a distribution frame or rack. As previously described, the furcation plug 60' has at least one groove 61 that extends at least partially along the periphery of the exterior surface of the epoxy shell 62. As shown, the furcation plug 60' has a pair of grooves 61 spaced apart lengthwise on the epoxy shell 62. Though not visible in FIG. 6, the furcation plug 60' also has a corresponding pair of grooves 61 on the opposite side of the periphery of the epoxy shell 62 about 180 degrees from the visible grooves 61 (see the broken lines in FIG. 4) so that the furcation plug 60' can be integrated with the communications hardware on either side of the epoxy plug 62. As shown, the first means 90 comprises a universal bracket 92 that is adapted for mounting to the communications hardware (not shown). In particular, the mounting bracket 92 has at least one elongate channel, and preferably, a pair of elongate channels 91, 93 that are oriented perpendicular to one another. The channels 91, 93 receive threaded bolts or studs 94 from any convenient location on the communications hardware so that the bracket 92 can be readily secured to the communications hardware with one or more fasteners, such as nuts 95. The first means 90 further comprises a generally L-shaped angle guide 96 and a guide attachment 97 for attaching the epoxy shell 62 of the furcation plug 60' to the mounting bracket 92. In particular, the angle guide 96 comprises a flange 96' that engages one of the grooves 61 on the exterior surface of the epoxy shell 62 in a sliding relation. The angle guide 96 may also comprise a lip adjacent the flange 96' that engages an edge of the mounting bracket 92 as illustrated by the furcation plug 60' shown on the right-hand side of FIG. 6. The guide attachment 97 comprises a transition surface 97' that conforms to the shape of the exterior surface of the epoxy shell 62 and a tab that is received within an opening provided on the angle guide 96 to loosely interlock the angle guide 96 and the guide attachment 97. The guide attachment 97 is also provided with an opening (shown as a U-shaped slot) opposite the tab that receives a threaded bolt or stud 98 to secure the attachment guide 97 and the angle guide 96 (and hence the epoxy shell 62 of the furcation plug 60') to the mounting bracket 92 with a suitable fastener, such as nut 99. Accordingly, the furcation plug 60' is readily integrated with the communications hardware. The first means 90 has been shown and described herein with reference to a distribution frame or rack, however, the first means 90 may also be utilized to readily integrate the furcation plug 60' with a cross-connect housing, or with a termination cabinet, module, pedestal, patch panel or the like in a similar manner without departing from the intended scope of the present invention.

Figure 7:
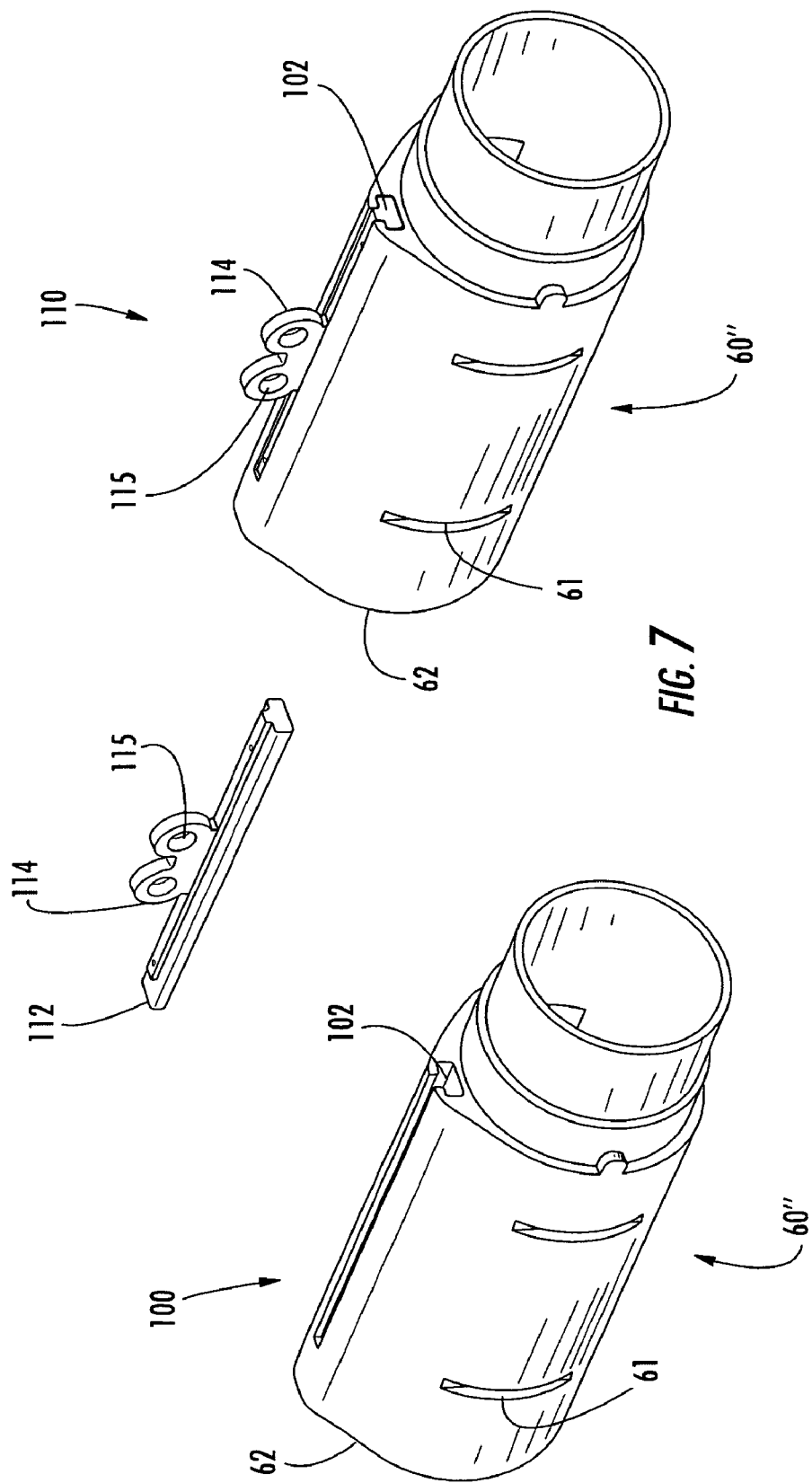
FIG. 7 is a partially exploded perspective view illustrating a second means and a third means for readily integrating the furcation plug of the pulling grip of FIG. 1A with conventional communications hardware in accordance with another exemplary embodiment of the present invention.

FIG. 7 illustrates a furcation plug 60" according to an exemplary embodiment of the present invention comprising a second means 100 and a third means 110 for readily integrating the furcation plug 60" with communications hardware, such as a conventional distribution frame or rack, or a cross-connect housing on a distribution frame or rack. The furcation plug 60" is substantially the same as the furcation plugs 60, 60' previously described with the addition that a channel 102 is provided on the exterior surface of the epoxy shell 62. The channel 102 extends lengthwise from the rear end of the epoxy shell 62 adjacent the back nut 64 to substantially the front end of the epoxy shell 62, but preferably, does not extend completely to the front end of the epoxy shell 62. FIG. 8A illustrates the furcation plug 60" integrated with a conventional distribution frame or rack 104 utilizing the second means 100. For example, the channel 102 may engage a flange 105 that extends outwardly from a frame member of the distribution frame or rack 104. Alternatively, as shown the channel 102 may engage one or more mounting studs 106 that extend outwardly a relatively short distance from the distribution frame or rack. Accordingly, the second means 100 readily integrates the furcation plug 60" with the distribution frame or rack 104 without requiring a significant amount of additional mounting hardware. Alternatively, the furcation plug 60" can be adapted to utilize the third means 110 to readily integrate the furcation plug 60" with the communications hardware. FIG. 8B illustrates the furcation plug 60" integrated with the conventional distribution frame or rack 104 utilizing the third means 110. The third means 110 comprises an adapter 112 that is sized and shaped to be received within the channel 102 on the exterior surface of the epoxy shell 62. The adapter 112 is provided with at least one ear 114 having an opening 115 that is sized and shaped to receive a mounting fastener 116 that extends outwardly from a frame member of the distribution frame or rack 104, such as a threaded bolt secured by a nut 118. Accordingly, the third means 110 readily integrates the furcation plug 60" with the distribution frame or rack 104 without requiring a significant amount of additional mounting hardware. The adapter 112 permits the furcation plug 60" to be readily integrated with communications hardware having either the mounting bracket 92, the flange 105, the mounting stud 106 or the mounting fastener 116 previously described without the need to provide the furcation plug 60" with a variety of different sized mounting clips, brackets, fasteners or cable ties. The second means 100 and the third means 110 have been shown and described herein with reference to a distribution frame or rack 104, however, the second means 100 and the third means 110 may also be utilized to readily integrate the furcation plug 60" with a cross-connect housing, or with a termination cabinet, module, pedestal, patch panel or the like in a similar manner without departing from the intended scope of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims. Although specific terms have been employed herein, they are used in a generic and descriptive sense only and not for purposes of limitation.

That which is claimed is:

1. A pulling grip for installing a pre-connectorized fiber optic cable having a terminated end with fiber optic connectors mounted upon the ends of respective optical fibers, the pulling grip comprising:
   a furcation plug attached to the terminated end of a fiber optic cable;
   a pulling grip housing for receiving and temporarily storing the furcation plug, the fiber optic connectors and the ends of the respective optical fibers, the pulling grip housing having a first housing portion defining an elongate channel for routing the optical fibers and a second housing portion defining a plurality of pockets, each pocket for storing a plurality of the fiber optic connectors;
   a pulling grip sleeve comprising a bag that is longitudinally openable to position the pulling grip sleeve over the pulling grip housing and the furcation plug, and to be closed around the pulling grip housing and the furcation plug to install the fiber optic cable; and
   wherein the pulling grip sleeve is removable from the fiber optic cable once the fiber optic cable is installed, and the bag is closeable.

2. A pulling grip according to claim 1 wherein the bag of the pulling grip sleeve is provided with at least one opening at one end and at least one handle at the opposite end and wherein, to be longitudinally openable and closeable, the bag defines a lengthwise slit extending from the opening in the direction of the handle.

3. A pulling grip according to claim 2 wherein the slit is adapted to be opened and closed by a zipper extending lengthwise from the opening substantially to the handle.

4. A pulling grip for installing a pre-connectorized fiber optic cable having at least one terminated end with fiber optic connectors mounted upon at least one of the ends of respective optical fibers, the pulling grip comprising:
   a furcation plug attached to the terminated end of a fiber optic cable;
   a pulling grip housing for receiving and temporarily storing the furcation plug, the fiber optic connectors and the ends of the respective optical fibers;
   a pulling grip sleeve comprising a bag that is adapted to be opened to position the pulling grip sleeve over the pulling grip housing and the furcation plug and to be closed around the pulling grip housing and the furcation plug to install the fiber optic cable; and
   the pulling grip sleeve being removable from the fiber optic cable once the fiber optic cable is installed;

wherein the pulling grip housing has a first housing portion that defines an elongate channel for routing the optical fibers and a second housing portion that defines a plurality of pockets that each store a plurality of the fiber optic connectors.

5. A pulling grip according to claim 4 wherein the plurality of fiber optic connectors stored within each pocket defined by the second housing portion are bundled together and encompassed by a cylindrical wrap.

6. A pulling grip according to claim 5 wherein the wrap comprises a generally planar sheet of flexible material having opposed ends and wherein the wrap is wrapped around the plurality of fiber optic connectors and the opposed ends are secured together to define a hollow cylinder.

7. A pulling grip according to claim 6 wherein one of the first housing portion and the second housing portion has a lengthwise groove and the other comprises a lengthwise tongue that engages the groove to thereby secure the first housing portion and the second housing portion together in a closed configuration.

8. A pulling grip for installing a pre-connectorized fiber optic cable having at least one terminated end with fiber optic connectors mounted upon at least one of the ends of respective optical fibers, the pulling grip comprising:

a furcation plug attached to the terminated end of a fiber optic cable;

a pulling grip housing for receiving and temporarily storing the furcation plug, the fiber optic connectors and the ends of the respective optical fibers, the pulling grip housing having a first housing portion defining an elongate channel for routing the optical fibers and a second housing portion defining a plurality of pockets, each pocket for storing a plurality of the fiber optic connectors;

a pulling grip sleeve comprising a bag that is adapted to be opened to position the pulling grip sleeve over the pulling grip housing and the furcation plug and to be closed around the pulling grip housing and the furcation plug to install the fiber optic cable; and the pulling grip sleeve being removable from the fiber optic cable once the fiber optic cable is installed;

wherein the furcation plug comprises means for integrating the furcation plug with conventional communications hardware.

9. A pulling grip for installing a pre-connectorized fiber optic cable having a terminated end with fiber optic connectors mounted upon the ends of respective optical fibers, the pulling grip comprising:

a furcation plug attached to the terminated end of a fiber optic cable;

a pulling grip housing for receiving and temporarily storing the furcation plug, the fiber optic connectors and the ends of the respective optical fibers; and a pulling grip sleeve comprising a bag that is adapted to be opened to position the pulling grip sleeve over the pulling grip housing and the furcation plug and to be closed around the pulling grip housing and the furcation plug to install the fiber optic cable;

wherein the pulling grip sleeve is removable from the fiber optic cable once the fiber optic cable is installed;

wherein the furcation plug comprises at least one groove and wherein at least one of the first housing portion and the second housing portion comprises a corresponding ridge for engaging the groove to restrain lengthwise movement and rotation of the furcation plug relative to the pulling grip housing.

10. A pulling grip for installing a pre-connectorized fiber optic cable having a terminated end with fiber optic connectors mounted upon the ends of respective optical fibers, the pulling grip comprising:

a furcation plug attached to the terminated end of a fiber optic cable;

a pulling grip housing for receiving and temporarily encasing the fiber optic connectors, the optical fibers and at least a portion of the furcation plug, the pulling grip housing having a first housing portion defining an elongate channel for routing the optical fibers and a second housing portion defining a plurality of pockets, each pocket for storing a plurality of the fiber optic connectors; and a pulling grip sleeve adapted to be positioned over the pulling grip housing and at least a portion of the furcation plug.

11. A pulling grip according to claim 10 wherein the pulling grip housing is formed by a molded clamshell defining a hinge line that separates the first housing portion and the second housing portion and wherein the first housing portion and the second housing portion are folded about the hinge line to temporarily encase the fiber optic connectors, the optical fibers and at least a portion the furcation plug.

12. A pulling grip according to claim 11 wherein one of the first housing portion and the second housing portion has a lengthwise groove and the other comprises a lengthwise tongue that engages the groove to thereby secure the first housing portion and the second housing portion together in a closed configuration.

13. A pulling grip according to claim 10 wherein the first housing portion comprises a continuous first flange and a plurality of discontinuous second flanges and wherein the optical fibers are routed lengthwise underneath the first flange and between a pair of adjacent second flanges into one of the pockets.

14. A pulling grip according to claim 10 wherein the furcation plug comprises at least one groove and wherein at least one of the first housing portion and the second housing portion comprises a corresponding ridge for engaging the groove to restrain lengthwise movement and rotation of the furcation plug relative to the pulling grip housing.

15. A pulling grip according to claim 10 wherein the pulling grip housing is formed by a plurality of individual modules connected together by at least one flexible rod that is received within a lengthwise opening provided in one of the first housing portion and the second housing portion.

16. A pulling grip according to claim 15 wherein the plurality of modules comprise a plug end module, one or more connector modules, and a nose end module.

17. A pulling grip according to claim 15 wherein each of the plurality of modules has a lengthwise slot and comprises a lengthwise dove tail that engages the slot to thereby secure the first housing portion and the second housing portion together in a closed configuration.

18. A pulling grip according to claim 15 wherein each of the plurality of modules is injection molded.

19. A pulling grip for installing a pre-connectorized fiber optic cable having a terminated end with fiber optic connectors mounted upon the ends of respective optical fibers, the pulling grip comprising:

a furcation plug attached to the terminated end of a fiber optic cable;

a pulling grip housing for receiving and temporarily encasing the fiber optic connectors, the optical fibers and at least a portion of the furcation plug; and a pulling grip sleeve adapted to be positioned over the pulling grip housing and at least a portion of the furcation plug;

wherein the pulling grip housing is formed by a plurality of individual modules connected together by at least one flexible rod.

20. A pulling grip according to claim 19 wherein the plurality of modules comprise a plug end module, one or more connector modules, and a nose end module.

21. A pulling grip according to claim 19 wherein the pulling grip housing has a fist housing portion defining an elongate channel for routing the optical fibers and a second housing portion defining at least one pocket for storing a plurality of the fiber optic connectors.

* * * * *

UNITED STATES PATENT AND TRADEMARK OFFICE
CERTIFICATE OF CORRECTION

| | |
|---|---|
| PATENT NO. | : 6,993,237 B2 |
| APPLICATION NO. | : 10/724510 |
| DATED | : January 31, 2006 |
| INVENTOR(S) | : Cooke et al. |

It is certified that error appears in the above-identified patent and that said Letters Patent is hereby corrected as shown below:

Column 20, Line 2, change "fist" to --first--.

Signed and Sealed this

Fourteenth Day of November, 2006

JON W. DUDAS
*Director of the United States Patent and Trademark Office*